United States Patent
Wei et al.

(10) Patent No.: US 6,628,749 B2
(45) Date of Patent: Sep. 30, 2003

(54) SYSTEMS AND METHODS FOR INTENSITY CORRECTION IN CR (COMPUTED RADIOGRAPHY) MOSAIC IMAGE COMPOSITION

(75) Inventors: Guo-Qing Wei, Plainsboro, NJ (US); Jianzhong Qian, Princeton Junction, NJ (US); Helmuth Schramm, Neunkirchen (DE); Carol Novak, Newtown, PA (US)

(73) Assignee: Siemens Corporate Research, Inc., Princeton, NJ (US)

( * ) Notice: Subject to any disclaimer, the term of this patent is extended or adjusted under 35 U.S.C. 154(b) by 0 days.

(21) Appl. No.: 10/255,408

(22) Filed: Sep. 26, 2002

(65) Prior Publication Data

US 2003/0068016 A1 Apr. 10, 2003

Related U.S. Application Data

(60) Provisional application No. 60/326,233, filed on Oct. 1, 2001.

(51) Int. Cl.$^7$ ............................................. G01N 23/04
(52) U.S. Cl. .............................................. 378/62; 378/4
(58) Field of Search .............................. 378/4, 15, 62, 378/98, 901

(56) References Cited

U.S. PATENT DOCUMENTS

| 5,099,505 A | * | 3/1992 | Seppi et al. ................. 378/65 |
| 5,168,532 A | * | 12/1992 | Seppi et al. ................. 382/270 |
| 5,986,279 A | | 11/1999 | Dewaele ...................... 250/582 |
| 6,101,238 A | | 8/2000 | Murthy et al. ................ 378/62 |
| 2002/0150215 A1 | * | 10/2002 | Barnes et al. ............... 378/197 |

OTHER PUBLICATIONS

Copy of U.S. patent application Ser. No. 09/855,956, filed May 15, 2001, entitled "Method and System for Automatic Computed Radiography (CR) Image Composition by White Band Detection and Consistency Rechecking".

* cited by examiner

Primary Examiner—David V. Bruce
(74) Attorney, Agent, or Firm—Donald B. Paschburg; F. Chau & Associates, LLP

(57) ABSTRACT

Systems and methods for correcting the image intensity of under-exposed regions of CR (computed radiography) images for mosaic composition. In one aspect, a method for generating a mosaic CR image comprises acquiring a set of CR images and processing each CR image to detect an under-exposed region in the CR image. If an under-exposed region is detected, the CR image is separated into an under-exposed region and normal exposure region. The image intensity of the under-exposed region is then adjusted to be substantially similar to, or as close as possible to, the image intensity of the normal exposure region of the CR image using nonlinear enhancement and/or linear transformation techniques. The intensity corrected CR images are then combined in a mosaic image.

26 Claims, 8 Drawing Sheets

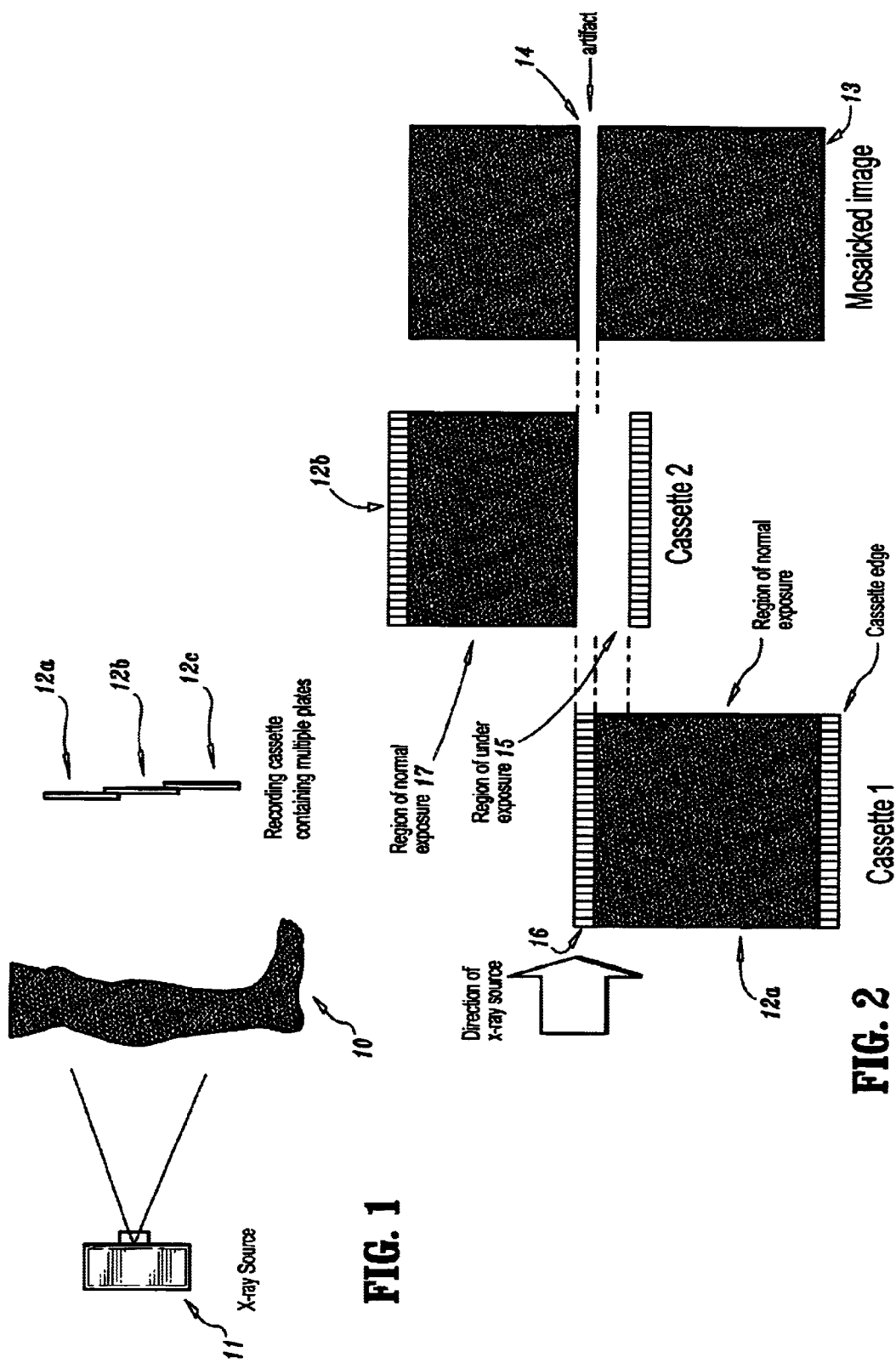

SYSTEMS AND METHODS FOR INTENSITY CORRECTION IN CR (COMPUTED RADIOGRAPHY) MOSAIC IMAGE COMPOSITION

CROSS-REFERENCE TO RELATED APPLICATION

This application claims priority to U.S. Provisional Application Ser. No. 60/326,233, filed on Oct. 1, 2001, which is incorporated herein by reference.

TECHNICAL FIELD

The present invention generally relates to computed radiography (CR) imaging, and more particularly, to systems and methods for intensity correction of under-exposed regions within CR images using nonlinear enhancement and/or linear transformation techniques.

BACKGROUND

In computed radiography (CR), multiple cassettes containing storage phosphor plates may be positioned together with a certain amount of overlap between neighboring cassettes, so that anatomy larger than the size of a single plate can be imaged. FIG. 1 illustrates a method for acquiring CR images using multiple cassettes. An object 10 (e.g. person's leg, as shown) to be imaged is positioned within a field of view between a x-ray source 11 and multiple image-recording cassettes 12a, 12b, and 12c. Each of the cassettes 12a–c are shorter than the length of the object 10. The image recording cassettes overlap one another with each cassette acquiring a high resolution image of a portion of the object 10 to ensure the object 10 is entirely recorded. The CR images of each cassette are then combined into a mosaic image. Advantages of this kind of image acquisition, include, for example, no artifacts caused by body motion and a perfect alignment between successive images.

There are known methods for composing a mosaic image (i.e. seamlessly combining individual CR images). For instance, one method is based on cross-correlation techniques, as disclosed in U.S. Pat. No. 6,101,238, entitled "System for generating a compound x-ray image for diagnosis," which issued August 2000. Another method is based on reference grid lines, as disclosed in U.S. Pat. No. 5,986,279, issued Nov. 16, 1999, entitled "Method of recording and reading a radiation image of an elongate body". These conventional methods, however, generate artifacts in the CR mosaic image composition.

More specifically, FIG. 2 illustrates how artifacts are generated in a mosaic CR image using conventional imaging methods. In FIG. 2, two overlapping cassettes 12a and 12b are shown, which cause an under-exposed region 15 within the image captured on cassette 12b. More specifically, since the two neighboring cassettes 12a and 12b are overlapped, with cassette 12b lying behind cassette 12a when viewed from the x-ray source, an under-exposed region 15, or what is referred to herein as "white band" region, is formed in the image captured on cassette 12b. The overlapped region in the underlying cassette 12b is less exposed thereby generating an under-exposed region 15 (or white band) in the image of the cassette 12b. The white band 15 in the image is under-exposed and not as defined as a normal exposure region 17.

In addition, due to the presence of a thick metal edge 16 of cassette 12a, the portion of the under-exposed region 15 of cassette 12b corresponding to the metal edge 16 of cassette 12a appears in the mosaic image 13 as an artifact 14, or white strip.

The presence of under-exposed regions within a CR image not only cause visual disturbances for the examining physicians, but also may hide important diagnostic information. Thus, it is very desirable to provide a method to regulate the intensities of the under-exposed image regions so that the under-exposed regions may appear equally definite and clear as other parts of the image. Such a method would ensure that important anatomies in the under-exposed regions can be brought into better visibility for diagnosis.

SUMMARY OF THE INVENTION

It is an object of this invention to provide an automatic method for correcting the image intensity of under-exposed regions (or "white band" regions) within a CR image, so that artifacts can be removed or reduced from CR images without introducing any additional distortion to the diagnostic information.

In one aspect of the invention, a method for generating a mosaic CR image comprises acquiring a set of CR images and processing each CR image to detect an under-exposed region (or "white band") in the CR image. If an under-exposed region is detected, the CR image is separated into an under-exposed region and a normal exposure region. The image intensity of the under-exposed region is then adjusted to be substantially similar, or as close as possible, to the image intensity of the normal exposure region of the CR image using linear transformation techniques and/or nonlinear enhancement. The intensity corrected CR images are then combined in a mosaic image.

In another aspect of the invention, a method for adjusting the intensity of a computed radiography (CR) image comprises inputting a CR image and separating the CR image into a normal exposure region and an under-exposed region. The under-exposed region of the CR image is then enhanced. Preferably, the process of enhancing the under-exposed region comprises applying a non-linear transformation to the under-exposed region to increase the dynamic range of intensity variations of the under-exposed region. A set of intensity correction parameters is then determined using the enhanced under-exposed region and the normal exposure region. Preferably, the intensity correction parameters are determined by performing a linear regression on samples of equal size of the enhanced under-exposed region and the normal exposure region. The image intensity of the enhanced under-exposed region is then adjusted using the intensity correction parameters. Preferably, the image intensity adjustment process comprises applying a linear transformation to the enhanced under-exposed region using the determined intensity correction parameters.

In another aspect of the invention, a method for adjusting the image intensity of a computed radiography (CR) image comprises a process for automatically determining whether to enhance the under-exposed region, which prevents over-enhancement of the under-exposed region. The method comprises inputting a CR image and separating the CR image into a normal exposure region and an under-exposed region. The image intensity of the under-exposed region is enhanced, preferably using a non-linear transformation to increase the dynamic range of intensity variations of the under-exposed region. A first set of intensity correction parameters are determined using the enhanced under-exposed region and the normal exposure region, preferably by performing a linear regression of the enhanced under-exposed region and equal size sample of the normal exposure region. A second set of intensity correction parameters is further determined using the under-exposed region and the normal exposure region, preferably by performing a linear regression of equal size samples of the under-exposed region and of the normal exposure region. Then, the first and second set of intensity correction parameters are evaluated to select the set of intensity correction parameters that would provide optimal intensity correction. Preferably, the evaluation process comprises determining which set of parameters provide a minimum residual error, and then selecting the set of parameters for intensity correction which provides the minimal residual error. If the first set of intensity correction parameters is selected, the image intensity of the under-exposed region is adjusted preferably applying a linear transformation to the enhanced under-exposed region using the first set of intensity correction parameters. If the second set of intensity correction parameters is selected, the image intensity of the under-exposed region is adjusted preferably by applying a linear transformation to the under-exposed region using the second set of intensity correction parameters.

These and aspects, objects, features and advantages of the present invention will be described or become apparent from the following detailed description of the preferred embodiments, which is to be read in connection with the accompanying drawings.

BRIEF DESCRIPTION OF THE DRAWINGS

FIG. 1 is a diagram of a conventional CR imaging method.

FIG. 2 is an exemplary diagram illustrating artifacts that are generated in a mosaic CR image due to under-exposed regions within component CR images.

DETAILED DESCRIPTION OF THE PREFERRED EMBODIMENT

The present invention generally relates to computed radiography (CR) imaging, and more particularly, to systems and methods for intensity correction of under-exposed regions within CR images using linear intensity transformation techniques and/or a nonlinear enhancement.

It is to be understood that the systems and methods described herein in accordance with the present invention may be implemented in various forms of hardware, software, firmware, special purpose processors, or a combination thereof. Preferably, the present invention is implemented in software as an application comprising program instructions that are tangibly embodied on one or more program storage devices (e.g., magnetic floppy disk, RAM, CD Rom, ROM and flash memory), and executable by any device or machine comprising suitable architecture.

It is to be further understood that since the constituent system modules and method steps depicted in the accompanying Figures are preferably implemented in software, the actual connection between the system components (or the flow of the process steps) may differ depending upon the manner in which the present invention is programmed. Given the teachings herein, one of ordinary skill in the related art will be able to contemplate these and similar implementations or configurations of the present invention.

Figure 3:
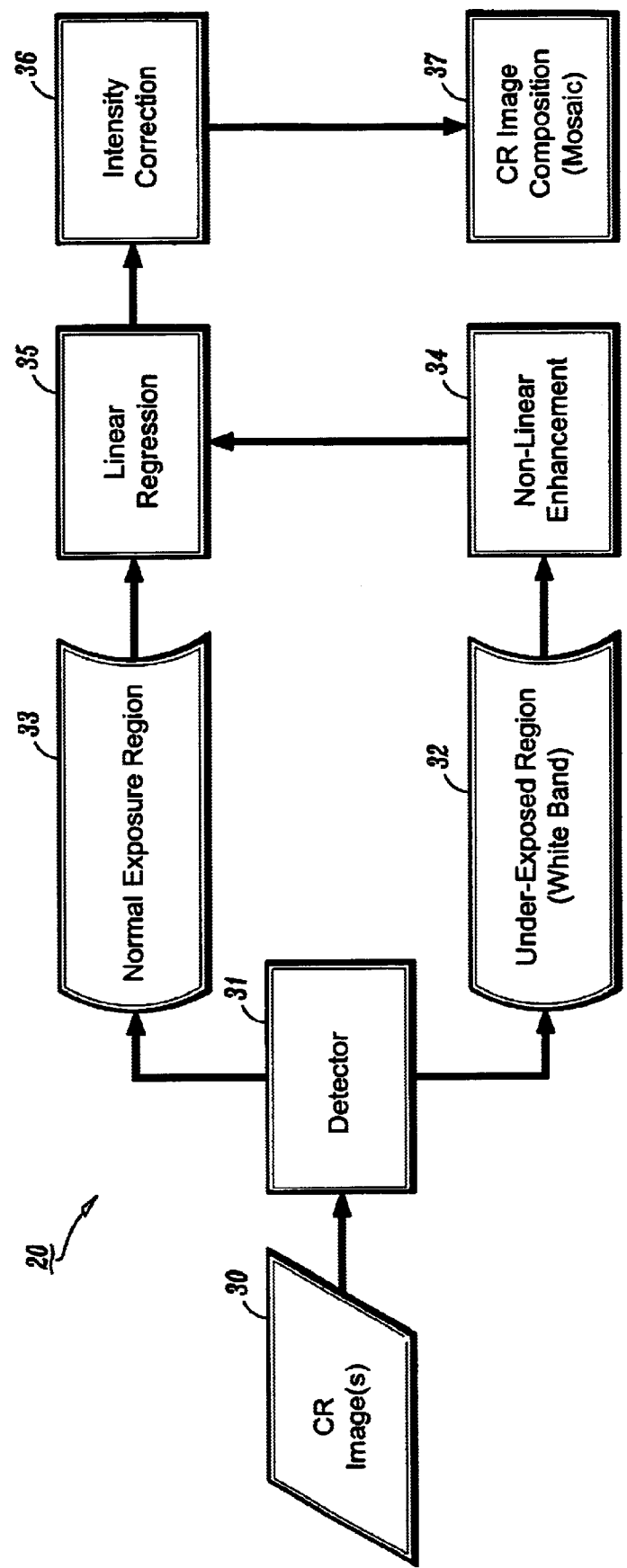
FIG. 3 is a diagram illustrating a system for correcting the intensity of an under-exposed region within a CR image, according to an embodiment of the present invention.

FIG. 3 is a block diagram of a system for correcting the image intensity of an under-exposed region within a CR image, according to an embodiment of the invention. The system 20 comprises means for inputting a set of CR images 30, and a detector 31 for detecting under-exposed regions within the CR images 30. For each component CR image, the detector 31 separates the image 30 into an under-exposed region 32 (or "white band" region) and a normal exposure region 33, if a white band is detected.

An imaged object within the under-exposed region 32 is less discernable from other anatomies in the normal exposure region 33 of the CR image 30. The under-exposed region 32 also has a different intensity range than that of the normal exposure region 33. Therefore, a simple linear scaling and/or a brightness shift of the under-exposed region 32 may not be able to bring the imaged object into better visibility. Thus, in accordance with the invention, the under-exposed region 32 is processed by a nonlinear enhancement module 34, which essentially stretches the dynamic range of intensity variations in the under-exposed region 32 to enhance an object image within the under-exposed region 32.

The normal exposure region 33 and the enhanced under-exposed region, which is output from the enhancement module 34, are processed by a linear regression module 35, wherein a linear regression is performed to determine linear intensity transformation parameters (or "intensity correction" parameters).

The linear regression module 35 determines intensity correction parameters using a minimization function, which enables the image intensity of the white band 32 to be adjusted as close as possible to the image intensity of the normal exposure region 33. The linear transformation parameters determined in linear regression module 35 are used by an intensity correction module 36, which performs procedures for correcting the image intensity of under-exposed region 32 in the inputted CR image 30. This processing is performed for each component CR image to be combined in a mosaic. The component CR intensity corrected images are then combined together in mosaic image module 37.

It is to be understood that any suitable process or technique may be used to detect an under-exposed region 32 (or white band) in a CR image. In a preferred embodiment, the white band detector 30 implements the methods disclosed in U.S. Ser. No. 09/855,956, filed on May 15, 2001, entitled: "Method and System for Automatic Computed Radiography (CR) Image Composition by White Band Detection and Consistency Rechecking", which is commonly assigned and incorporated herein by reference.

Figure 4:
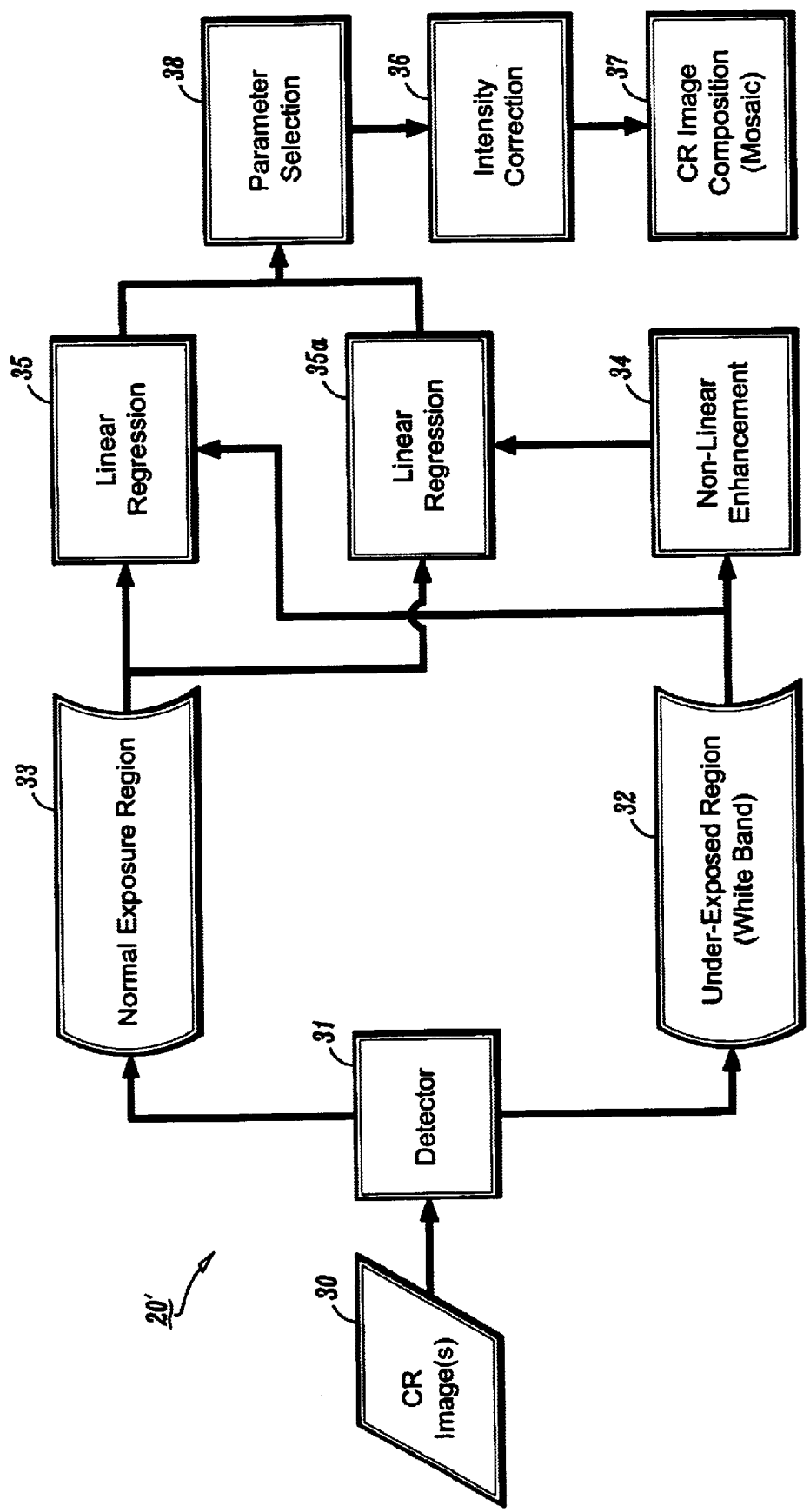
FIG. 4 is a diagram illustrating a system for correcting the intensity of an under-exposed region within a CR image, according to another embodiment of the present invention.

Referring now to FIG. 4, a block diagram illustrates a system 20' for correcting the image intensity of an under-exposed region within a CR image, according to another embodiment of the present invention. More specifically, the system 20' is similar to the system 20 of FIG. 3, but includes an automatic determination feature of whether to apply nonlinear enhancement 34 to the white band region 32 for image correction. Indeed, an enhancement of the under-exposed region 32 may cause the object image to be over-enhanced. In this case, a linear intensity transformation process alone is sufficient for adjusting the image intensity of the under-exposed region 32 to be substantially similar to, or as close as possible to, the image intensity of the normal exposure region 33. Therefore, the enhancement procedure 34 can be by-passed. In other words, in the embodiment of FIG. 4, intensity correction parameters as determined by a direct linear regression 35 between the under-exposed region 32 and the normal exposure region 33 of an input CR image 30, are used for adjusting the image intensity of the white band 32 when it is determined that nonlinear enhancement 34 is not needed.

More specifically, in the system 20' of FIG. 4, the under-exposed region 32 and the normal exposure region 33, or portions of such regions, are directly processed by the linear regression module 35 to determine a first set of linear transformation parameters. Further, the normal exposure region 33 and the enhanced under-exposed region, which is output from module 34, are processed by linear regression module 35a to determine a second set of linear transformation parameters. A selection module 38 determines (and selects) the set of intensity correction parameters having a minimal residual error as determined by the linear regression modules 35 and 35a. The selected intensity correction parameters are then used by the intensity correction module 36 to perform intensity correction to the under-exposed region 32 (or the enhanced under exposed region) using the selected intensity correction parameters and related procedures. After all component CR images are intensity corrected, the component images are then combined together in mosaic image module 37.

It is to be understood that the linear regression modules 35 and 35a, as shown in FIG. 4, perform the same function. The embodiment of FIG. 4 illustrates a system having multiple modules, 35 and 35a, for parallel processing. It is to be understood that the system 20' may comprise one linear regression module, wherein the above processing is performed sequentially, rather than in parallel.

Figure 5:
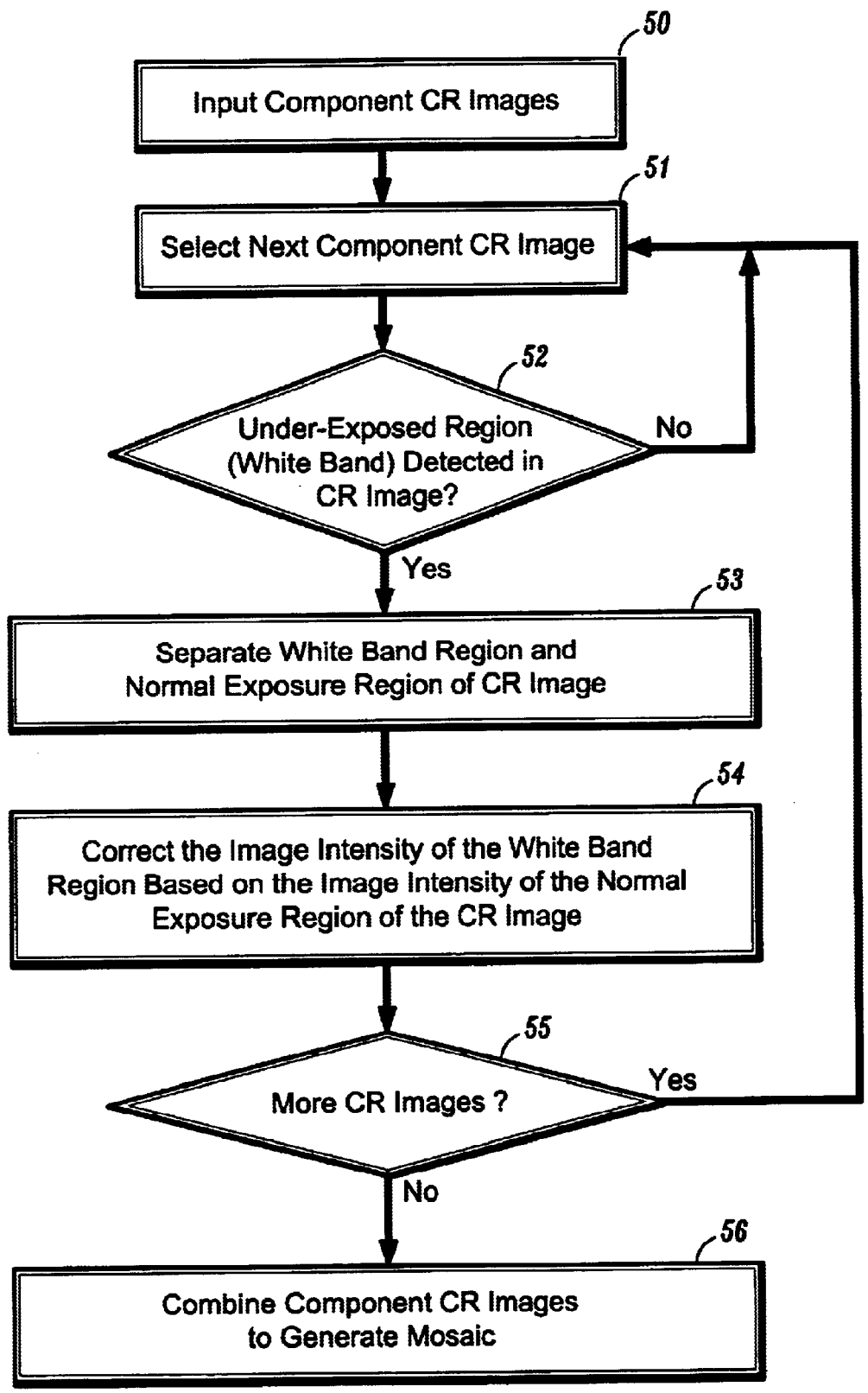
FIG. 5 is a flow diagram illustrating a method for generating a mosaic CR image using intensity correction, according to one aspect of the invention.

FIG. 5 is a flow diagram illustrating a method for generating a mosaic CR image using intensity correction, according to one aspect of the present invention. FIG. 5 is a general illustration of a mode of operation of the systems of FIGS. 3 and 4. Referring now to FIG. 5, initially a set of corresponding CR images are acquired and input into the system (step 50). A component CR image is then selected for processing (step 51). The CR image is processed to detect an under-exposed region (step 52). If an under-exposed region is detected (affirmative result in step 52), the image is separated into two regions; one corresponding to the white band region and the other corresponding to the normal exposure region (step 53). The image intensity of the under-exposed region is then adjusted to be substantially similar to, or as close as possible to, the image intensity of the normal exposure region of the CR image (step 54). Various methods for performing step 54 are described below with reference to FIGS. 6 and 7, for example. Once intensity correction has been applied to all the under-exposed regions in the component CR images (step 55), the CR images are combined to form a mosaic image (step 56) using any suitable, known method.

Figure 6:
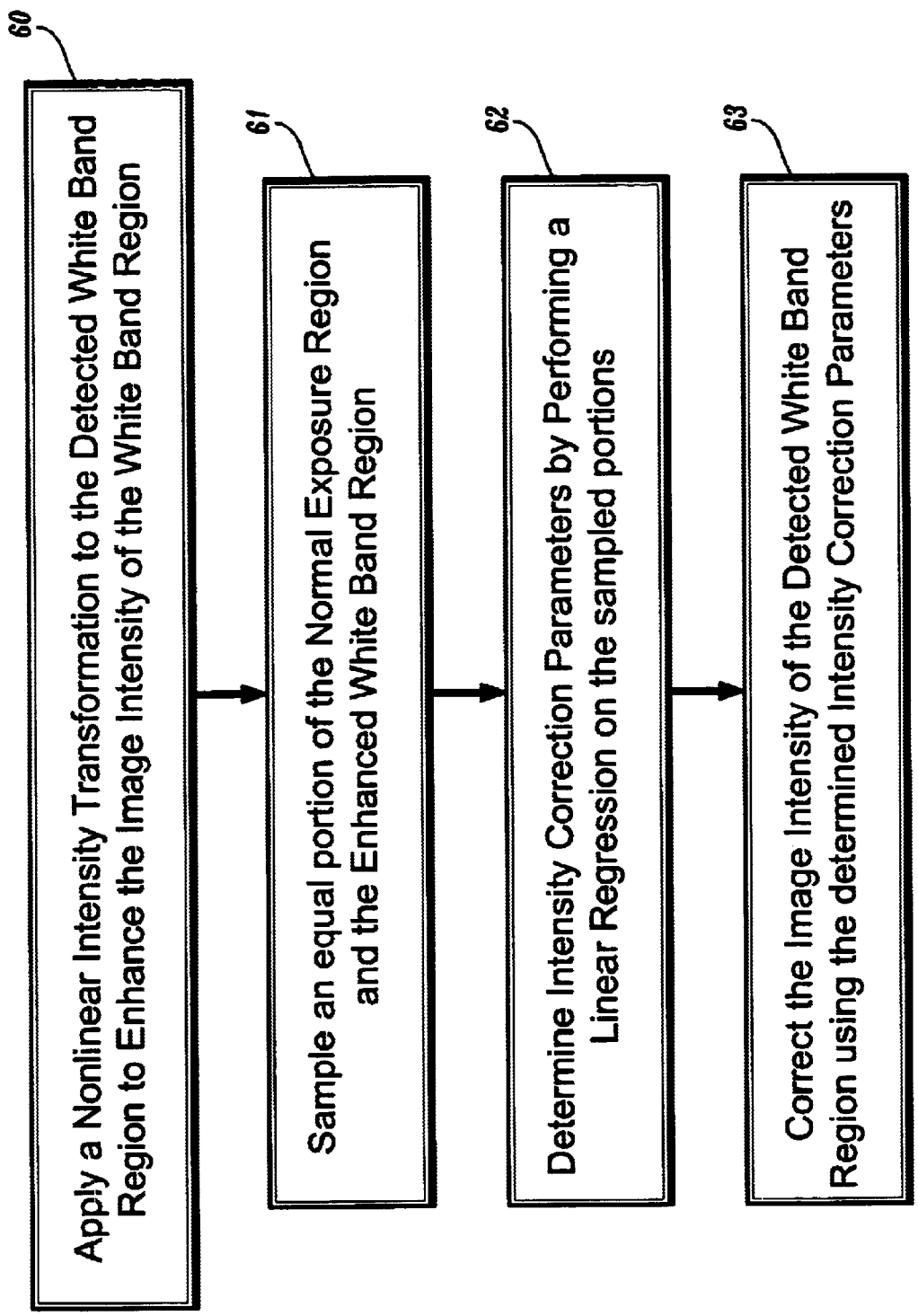
FIG. 6 is a flow diagram illustrating a method for correcting the intensity of an under-exposed region within a CR image, according one aspect of the present invention.

FIG. 6 is a flow diagram of a method for correcting the image intensity of a white band region in a CR image, according to one aspect of the invention. More specifically, FIG. 6 illustrates a method for intensity correction using a nonlinear and a linear transformation process. FIG. 6 illustrates a method that may be used for performing step 54 in FIG. 5.

Referring to FIG. 6, a nonlinear image intensity transformation is applied to the white band region of a CR image. It is to be understood that any nonlinear transformation may be used having the property of enhancing an object image (e.g. hidden bone structure) within a CR image. In a preferred embodiment, the following nonlinear enhancement process is employed. Assume I is the intensity of a pixel in the white band, and $I_{max}$ is the maximum intensity of the white band. Then, a transformed intensity $I_1$ can be described by:

$$I_1 = e^{\bar{I}^2} \quad (1)$$

where the normalized intensity $\bar{I}$ is given by $$\bar{I} = I/I_{max} \quad (2)$$

Figure 8:
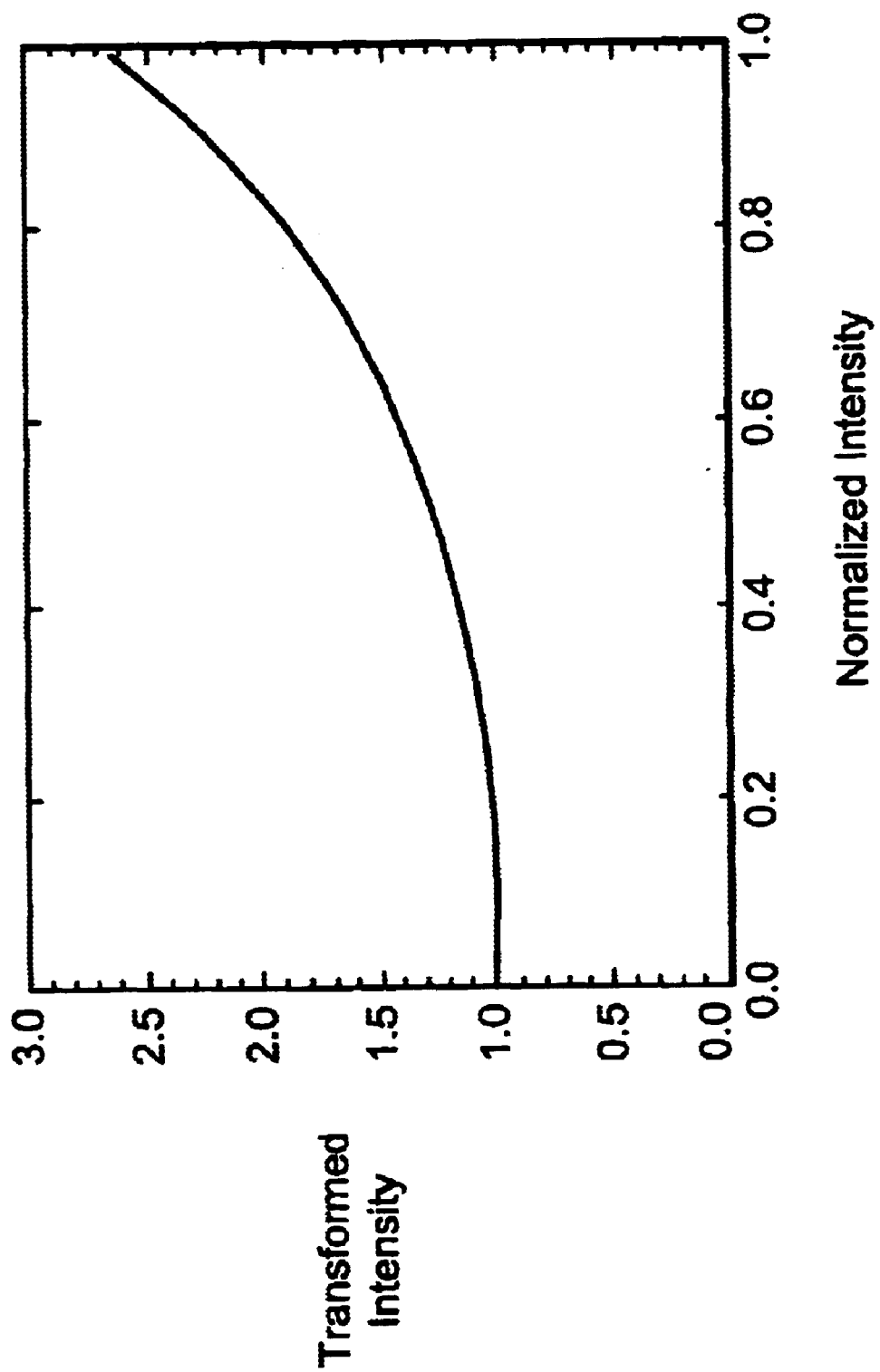
FIG. 8 is an exemplary graphical diagram illustrating a non-linear transform method that may be employed for enhancing an under-exposed region within a CR image.

The non-linear transformation (equation (1)) stretches the dynamic range of intensity variations in the white band, so that an important structure (e.g., bone structure) can be enhanced. FIG. 8 depicts a curve of the transformation of equation (1). More specifically, FIG. 8 illustrates the transformed image intensity $I_1$ as a function of the normalized intensity $\bar{I}$. It is to be understood that the invention is not limited to the transformation process of equation (1). Indeed, any other nonlinear transformation having the property of enhancing an object (e.g., a hidden bone structure) within a CR image may be used instead of equation (1) to perform the nonlinear enhancement (step 60).

Next, since the nonlinear transformation stretches the intensity of the under-exposed region to a different range than that of the normal exposure region, a linear transformation is then used to adjust the intensity range of the enhanced under-exposed region. The first step is to take the entire enhanced under-exposed region and a sample of equal portion of the normal exposure region (step 61). Then, these portions are processed using linear regression to determine the intensity correction parameters(step 62). It is to be understood that in situations where the normal exposure region is smaller then the white band region, the entire normal exposure region and an equal portion of the under-exposed region are preferably processed using linear regression.

It is to be further understood that any linear transformation may be used having the property of to adjust the intensity range of the under-exposed region (white band region) to be substantially similar to, or as close as possible to, the image intensity of the normal exposure region. In a preferred embodiment of the present invention, a linear regression process (step 62) is performed as follows. Assume $I_1(x,y)$ is the intensity function of the enhanced under-exposed region (i.e., the intensity function of the white band region after nonlinear transformation). The intensity adjustment (step 63) is preferably determined as follows:

$$I'_1(x,y) = aI_1(x,y) + b \quad (3)$$

where $I'_1(x,y)$ is the adjusted intensity function of the enhanced white band, and where a and b are linear transformation parameters determined by a linear regression procedure (step 62).

Assume further that $I_2(x,y)$ is the intensity function of a sub-image of the normal exposure region having a same size as the enhanced under-exposed region $I_1(x,y)$ in the same CR image. The sub-image $I_2(x,y)$ is preferably chosen as the immediate neighbor of $I_1(x,y)$ in the other side of the white band. The linear transformation parameters a and b are preferably determined according to the following minimization:

$$\min_{a,b} \sum_{x,y} (I_2(x,y) - aI_1(x,y) - b)^2 \quad (4)$$

This physical meaning of this minimization is that $I_1(x,y)$ is adjusted so that its brightness is as close as possible to that of $I_2(x,y)$. This leads to two linear equations on a and b:

$$\left(\sum_{x,y} I_1(x,y)^2\right) a + \left(\sum_{x,y} I_1(x,y)\right) b = \sum_{x,y} I_1(x,y) I_2(x,y)$$

$$\left(\sum_{x,y} I_1(x,y)\right) a + Kb = \sum_{x,y} I_2(x,y)$$

where K is the total number of pixels in $I_1(x,y)$. The above equations are solved for the parameters a and b.

Once the intensity correction parameters a,b are determined, the enhanced under-exposed region is adjusted (step 63) using such parameters in equation (3), for example.

Figure 9A:
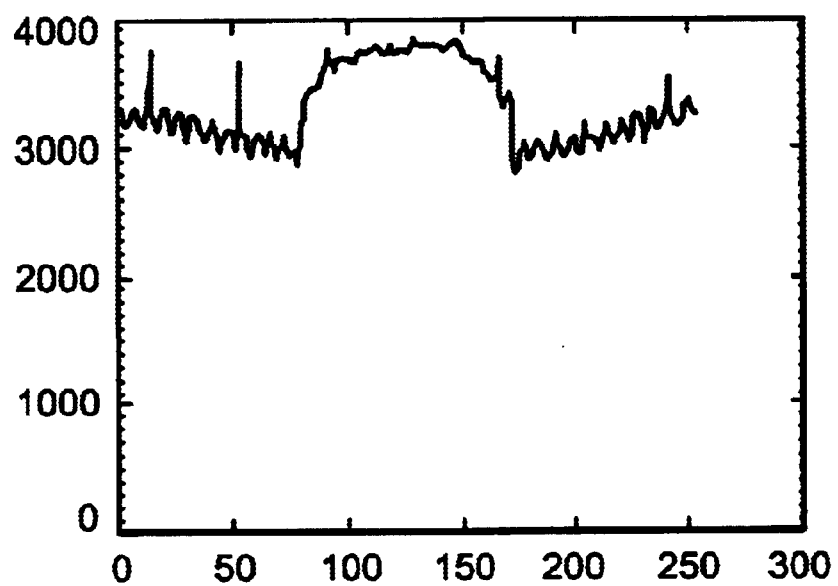
FIG. 9a is an exemplary diagram illustrating an intensity profile of an under-exposed region along a horizontal line of the under-exposed region verses the intensity value, prior to intensity correction of the under-exposed region.
Figure 9B:
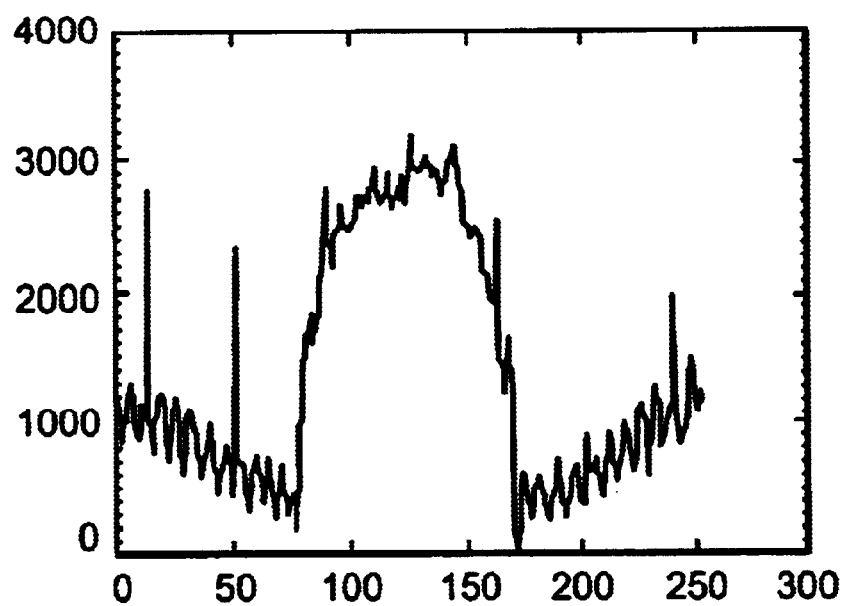
FIG. 9b is an exemplary diagram illustrating the intensity profile of the same under-exposed region of FIG. 9a along a horizontal line of the under-exposed region, after the image intensity of the under-exposed region is corrected using nonlinear enhancement followed by a linear regression transformation.

FIG. 9 is an exemplary graphical diagram illustrating an intensity correction of an under-exposed region using the method of FIG. 6. More specifically, FIG. 9a is an exemplary diagram illustrating an intensity profile of an under-exposed region along a horizontal line of the under-exposed region verses the intensity value, prior to intensity correction of the under-exposed region. FIG. 9b is an exemplary diagram illustrating the intensity profile of the same under-exposed region of FIG. 9a along a horizontal line of the under-exposed region, after the image intensity of the under-exposed region is corrected using nonlinear enhancement followed by a linear regression transformation.

Figure 7:
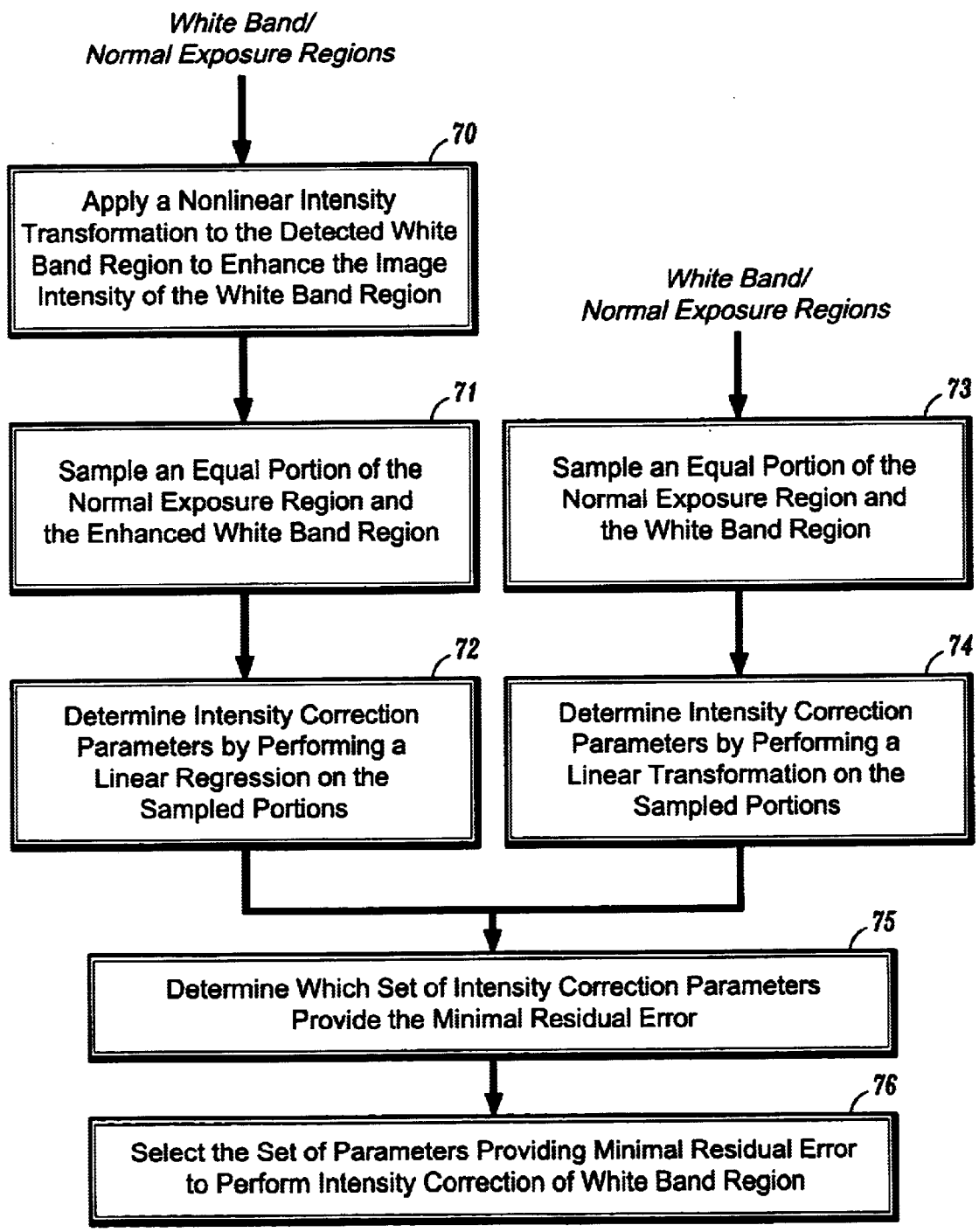
FIG. 7 is a flow diagram illustrating a method for correcting the intensity of an under-exposed region within a CR image, according to another aspect of the present invention.

FIG. 7 is a flow diagram illustrating a method for correcting image intensity of a white band region in a CR image, according to another aspect of the present invention. The method of FIG. 7 may be used for performing step 54 in FIG. 5, providing an automated method for determining whether to apply the nonlinear enhancement to the under-exposed region. FIG. 7 illustrates a method of operation of the system 20' of FIG. 4.

More specifically, in FIG. 7, two sets of intensity correction parameters are generated using the process of steps 70–72 and the process of steps 73–74. The process of steps 70–72 is similar to the process of steps 60–62 in FIG. 6. The process of steps 70–72 generates a set of parameters by performing a linear regression on the nonlinear enhanced white band region and the normal exposure region. The process of steps 73–74 generates another set of intensity correction parameters by performing a linear regression on the under-exposed region and the normal exposure region. It is to be understood that these processes (steps 70–72 and steps 73–74) can be performed in parallel, as shown, or in series.

Each set of intensity correction parameters are evaluated to determine which set provides a minimum residual error (step 75). The set of intensity correction parameters having the minimal residual error are then selected to perform intensity correction to the white band region of a CR image (step 76). Preferably, this intensity correction is performed using equation (3), where $I_1(x,y)$ represents either the enhanced white band region or original white band region.

Thus, in accordance with intensity correction techniques of the invention, component CR images can be processed to correct the image intensity of their under-exposed regions using, for example, the methods of FIG. 6 or 7. The intensity corrected CR images can then be combined together using known mosaic techniques. In this manner, artifacts can advantageously be eliminated or reduced from the resulting mosaic image.

Although illustrative embodiments have been described herein with reference to the accompanying drawings, it is to be understood that the invention is not limited to the precise system and method embodiments described herein, and that various other changes and modifications may be affected therein by one skilled in the art without departing form the scope or spirit of the invention. All such changes and modifications are intended to be included within the scope of the invention as defined by the appended claims.

What is claimed is:

1. A method for adjusting the intensity of a computed radiography (CR) image, comprising the steps of:
   inputting a CR image;
   separating the CR image into a normal exposure region and an under-exposed region;
   enhancing the under-exposed region of the CR image;
   determining intensity correction parameters using the enhanced under-exposed region and the normal exposure region; and
   adjusting an image intensity of the enhanced under-exposed region using the intensity correction parameters.

2. The method of claim 1, wherein the step of enhancing the under-exposed region of the CR image comprises applying a non-linear transformation to the under-exposed region to increase the dynamic range of intensity variations of the under-exposed region.

3. The method of claim 1, wherein step of adjusting the image intensity comprises applying a linear transformation to the enhanced under-exposed region using the determined intensity correction parameters.

4. The method of claim 1, wherein the step of determining the intensity correction parameters comprises performing a linear regression on samples of equal size of the enhanced under-exposed region and the normal exposure region.

5. The method of claim 1, further comprising the step of combining a set of CR images having intensity adjusted under-exposed regions, into a mosaic image.

6. A method for adjusting the image intensity of a computed radiography (CR) image, comprising the steps of:
   inputting a CR image;
   separating the CR image into a normal exposure region and an under-exposed region;
   enhancing the image intensity of the under-exposed region;
   determining a first set of intensity correction parameters using the enhanced under-exposed region and the normal exposure region;

determining a second set of intensity correction parameters using the under-exposed region and the normal exposure region;

evaluating the first and second set of intensity correction parameters to select the set of intensity correction parameters that would provide optimal intensity correction; and adjusting the image intensity of the under-exposed region using the selected intensity correction parameters.

7. The method of claim 6, wherein the step of enhancing the under-exposed region of the CR image comprises applying a non-linear transformation to the under-exposed region to increase the dynamic range of intensity variations of the under-exposed region.

8. The method of claim 6, wherein the step of determining the first set of intensity correction parameters comprises performing a linear regression on samples of equal size of the enhanced under-exposed region and of the normal exposure region.

9. The method of claim 8, wherein the step of determining the second set of intensity correction parameters comprises performing a linear regression on samples of equal size of the under-exposed region and of the normal exposure region.

10. The method of claim 9, wherein the step of evaluating the first and second set of intensity correction parameters comprises the steps of:

determining which set of parameters provide a minimum residual error; and selecting the set of parameters providing the minimal residual error.

11. The method of claim 10, wherein the step of adjusting the image intensity comprises applying a linear transformation to the enhanced under-exposed region using the first set of intensity correction parameters, if the first set of intensity correction parameters is selected.

12. The method of claim 10, wherein the step of adjusting the image intensity comprises applying a linear transformation to the under-exposed region using the second set of intensity correction parameters, if the second set of intensity correction parameters is selected.

13. The method of claim 6, further comprising the step of combining a set of CR images having image intensity adjusted under-exposed regions into a mosaic image.

14. A program storage device readable by machine, tangibly embodying a program of instructions executable by the machine to perform method steps for adjusting the intensity of a computed radiography (CR) image, the method steps comprising:

inputting a CR image;

separating the CR image into a normal exposure region and an under-exposed region;

enhancing the under-exposed region of the CR image;

determining intensity correction parameters using the enhanced under-exposed region and the normal exposure region; and adjusting an image intensity of the enhanced under-exposed region using the intensity correction parameters.

15. The program storage device of claim 14, wherein the instructions for performing the step of enhancing the under-exposed region of the CR image comprise instructions for applying a non-linear transformation to the under-exposed region to increase the dynamic range of intensity variations of the under-exposed region.

16. The program storage device of claim 14, wherein the instructions for performing the step of adjusting the image intensity comprise instructions for applying a linear transformation to the enhanced under-exposed region using the determined intensity correction parameters.

17. The program storage device of claim 14, wherein the instructions for performing the step of determining the intensity correction parameters comprise instructions for performing a linear regression on samples of equal size of the enhanced under-exposed region and the normal exposure region.

18. The program storage device of claim 14, further comprising instructions for performing the step of combining a set of CR images having intensity adjusted under-exposed regions into a mosaic image.

19. A program storage device readable by machine, tangibly embodying a program of instructions executable by the machine to perform method steps for adjusting the intensity of a computed radiography (CR) image, the method steps comprising:

inputting a CR image;

separating the CR image into a normal exposure region and an under-exposed region;

enhancing the image intensity of the under-exposed region;

determining a first set of intensity correction parameters using the enhanced under-exposed region and the normal exposure region;

determining a second set of intensity correction parameters using the under-exposed region and the normal exposure region;

evaluating the first and second set of intensity correction parameters to select the set of intensity correction parameters that would provide optimal intensity correction; and adjusting the image intensity of the under-exposed region using the selected intensity correction parameters.

20. The program storage device of claim 19, wherein the instructions for performing the step of enhancing the under-exposed region of the CR image comprise instructions for applying a non-linear transformation to the under-exposed region to increase the dynamic range of intensity variations of the under-exposed region.

21. The program storage device of claim 19, wherein the instructions for performing the step of determining the first set of intensity correction parameters comprise instructions for performing a linear regression of the enhanced under-exposed region and equal size sample of the normal exposure region.

22. The program storage device of claim 21, wherein the instructions for performing the step of determining the second set of intensity correction parameters comprise instructions for performing a linear regression on samples of equal size of the under-exposed region and of the normal exposure region.

23. The program storage device of claim 22, wherein the instructions for performing the step of evaluating the first and second set of intensity correction parameters comprise instructions for performing the steps of:

determining which set of parameters provide a minimum residual error; and selecting the set of parameters providing the minimal residual error.

24. The program storage device of claim 23, wherein the instructions for performing the step of adjusting the image intensity comprise instructions for applying a linear transformation to the enhanced under-exposed region using the first set of intensity correction parameters, if the first set of intensity correction parameters is selected.

25. The program storage device of claim 23, wherein the instructions for performing the step of adjusting the image intensity comprise instructions for applying a linear transformation to the under-exposed region using the second set of intensity correction parameters, if the second set of intensity correction parameters is selected.

26. The program storage device of claim 19, further comprising instructions for performing the step of combining a set of CR images having image intensity adjusted under-exposed regions into a mosaic image.

* * * * *